United States Patent [19]

Matsumoto et al.

[11] Patent Number: 4,875,095
[45] Date of Patent: Oct. 17, 1989

[54] NOISE-SHAPING PREDICTIVE CODING SYSTEM

[75] Inventors: Shuichi Matsumoto, Fujimi; Hitomi Murakami, Yokohama, both of Japan

[73] Assignee: Kokusai Denshin Denwa Kabushiki Kaisha, Tokyo, Japan

[21] Appl. No.: 207,121

[22] Filed: Jun. 15, 1988

[30] Foreign Application Priority Data

Jun. 30, 1987 [JP] Japan .................. 62-161351
Jun. 30, 1987 [JP] Japan .................. 62-161352

[51] Int. Cl.⁴ .......................................... H04N 7/137
[52] U.S. Cl. .................................. 358/133; 358/36; 358/135; 358/167; 375/34
[58] Field of Search ............... 358/133, 135, 136, 36, 358/167; 375/34

[56] References Cited

U.S. PATENT DOCUMENTS

| | | | |
|---|---|---|---|
| 3,940,555 | 2/1976 | Amano | 375/31 |
| 4,334,237 | 6/1982 | Reitmeier | 358/36 |
| 4,731,664 | 3/1988 | Nishiwaki | 358/133 |

*Primary Examiner*—Howard W. Britton
*Attorney, Agent, or Firm*—Emmanuel J. Lobato; Robert E. Burns

[57] ABSTRACT

A noise-shaping predictive coding system is disclosed, in which the deviation (i.e. correlation) of quantization representative values, which occurs when the coding noise resulting from predictive coding is frequency-shaped by a noise shaping filter, is used to perform an coding operation, so that the quantization entropy can be reduced simultaneously. According to another aspect of the present invention, the human visual characteristic may be combined with the deviation of quantization representative values.

5 Claims, 9 Drawing Sheets

NOISE-SHAPING PREDICTIVE CODING SYSTEM

BACKGROUND OF THE INVENTION

The present invention relates to a predictive coding system which performs high efficiency coding of image signals as of commercial television or television conference system through utilization of high correlation between adjacent picture elements in a picture frame and, more particularly, to a coding system with a noise shaping function by which noise resulting from predictive coding is shaped into noise which cannot easily be recognized visually.

With the existing standard television system, a picture formed by frames which are transmitted at a rate of 30 per second, and each frame has two continuous fields because of interlaced scanning every other scanning line. The elements which constitute the picture frame are called "picture elements"; since in the present specification digital processing is taken into account, one sample obtained by sampling will hereinafter be referred to as a picture element. Accordingly, in this instance the position of each picture element in the picture frame depends on the sampling frequency for digitizing signals.

To reduce the required number of transmission bits for transmitting information of each picture element, quantization is generally employed.

In the reduction of the required number of transmission bits by nonlinear or linear quantization, an increase in the quantization step size will decrease the number of bits but, at the same time, it will cause an increase in the amount of coding noise which is superimposed on coded image signals. Accordingly, in the case of obtaining a coded image as faithful to the original image as possible and of low coding noise, the quantization step size cannot be selected very large, and hence a substantial reduction of the required number of transmission bits is difficult.

To solve this problem, permit a sharp reduction of the required number of transmission bits and implement a high-quality coded image, the prior art has utilized a noise shaping filter in predictive coding.

However, conventional noise shaping predictive coding system using a noise shaping filter has a defect such as increase of quantization entropy.

SUMMARY OF THE INVENTION

It is therefore an object of the present invention to provide a noise-shaping, predictive coding system which retains the improved picture quality by the noise shaping filter while at the same time permits the reduction of the quantization entropy.

Based on the fact that in case of employing the noise shaping filter, the quantization representative value has correlation between the current picture element ($X_i$) and the next subsequent one ($X_{i+1}$), the present invention has first feature in that quantization representation values of several picture elements are consolidated into a block for block quantization or coding is performed by adaptively switching a code which is assigned to the next quantization representative value on the basis of that of the immediately preceding picture element (which coding will hereinafter be referred to as "sort quantization").

According to second feature of the present invention, in the noise-shaping, predictive coding system in which information of an already coded picture element is used to obtain a predicted value of the next picture element to be coded, a prediction error value is obtained which is a difference value between an input picture element and the predicted value, a noise shaping filter value for compensating for the prediction error value is obtained from information of quantizing noise superimposed on the already coded picture element and a difference value between the prediction error value and the noise shaping filter value is quantized using a predetermined quantization representative value, an estimate value which is an absolute difference value between precoded picture elements is obtained by the compensation for the prediction error value with the noise shaping filter value, the estimate value is compared with a predetermined threshold value, and the prediction error value is encoded by quantizing it with the noise shaping filter value or by quantizing the prediction error value as it is, depending on whether the estimate value is smaller or greater than the threshold value.

According to third feature of the present invention, in the noise-shaping, predictive coding system in which information of an already coded picture is used to obtain a predicted value of the next picture element to be coded, a prediction error value is obtained which is a difference value between an input picture element and the predicted value, a noise shaping filter value for compensating for the prediction error value is obtained from information of quantizing noise superimposed on the already coded picture element and a difference value between the prediction error value and the noise shaping filter value is quantized using a predetermined quantization representative value, an estimate value is obtained which is an absolute difference value between precoded picture elements, the estimate value and a predetermined threshold value are compared with each other, the prediction error value is selectively compensated for with the noise shaping filter value in accordance with the results of comparison and is quantized, and through utilization of the correlation between quantization representative values used for the selective correction and quantization of the prediction error value, the quantization representative values of several picture elements are consolidated into a block and the block is coded or the quantization representative value of the next picture element is coded adaptively changing the code to be assigned thereto, on the basis of the quantization representative value of the immediately preceding picture element.

BRIEF DESCRIPTION OF THE DRAWINGS

The present invention will be described in detail below in comparison with prior art with reference to the accompanying drawings, in which.

DETAILED DESCRIPTION

To make differences between prior art and the present invention clear, prior art will first be described.

Figure 1:
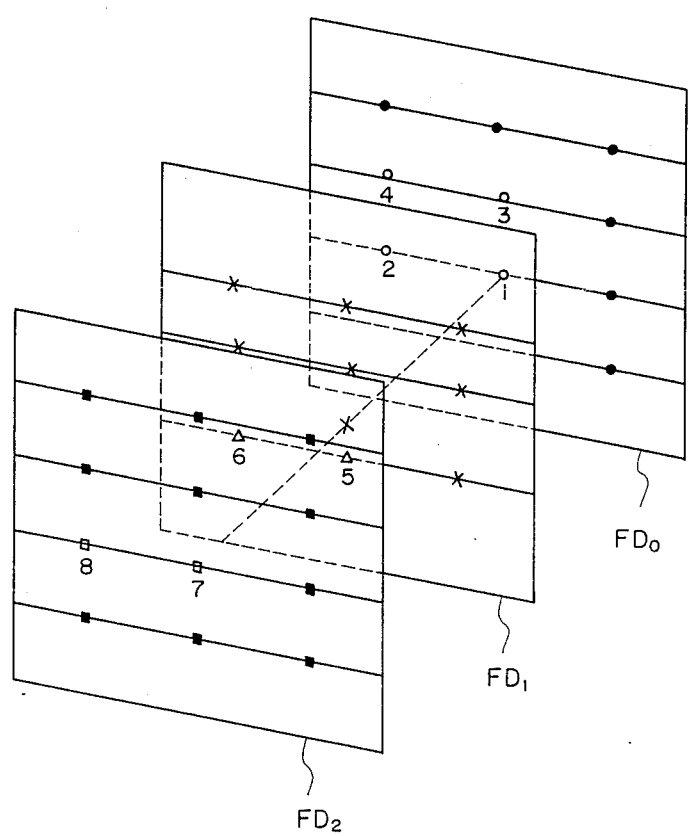
FIG. 1 is a diagram showing the positional relationships of picture elements for explaining the conventional predictive coding.

FIG. 1 shows the positional relationships of picture elements 1 to 8, for explaining a conventional predictive coding system. Now, since the sampling frequency $f_s$ is selected to be an integral multiple of the horizontal scanning frequency, the picture elements are arranged in a matrix form, with lines of the preceding field $FD_1$ lying between lines of the current field $FD_0$ because of interlaced scanning. In this case, the picture element 2 lies at the left side of the current picture element 1 next thereto on the same line; the picture elements 3 and 4 lie just above the picture elements 1 and 2, respectively, one line above in the same field $FD_0$; the picture elements 5 and 6 lie just below the picture elements 1 and 2, respectively, one line below in the immediately preceding field $FD_1$; and the picture elements 7 and 8 lie at the same positions as the picture elements 1 and 2, respectively, in a field $FD_2$ one frame before the current field $FD_0$.

In this instance, it can be considered that sample values of some closely spaced picture elements have high correlation. According to the prior art system, a prediction value $\overline{X}_1$ of the sample value $X_1$ of the picture element 1 is obtained in the following form, for example, using sample values of the adjoining picture elements:

$$\overline{X}_1 = (\tfrac{1}{2})X_2 + X_3 - (\tfrac{1}{2})X_4 \qquad (1)$$

and a difference between this prediction value $\overline{X}_1$ and the true value $X_1$ $$\Delta X_1 = X_1 - \overline{X}_1 \qquad (2)$$

is used as a prediction error, and by quantizing and coding this error, high efficiency coding is performed with a reduced number of bits needed to be transmitted.

In general, quantization is divided into nonlinear quantization and linear quantization. In nonlinear quantization, since the width of the input range of the prediction error (the quantization step size) differs for each level number as shown below in Table 1, the transmission code used is usually a fixed-length code. On the other hand, in linear quantization, the quantization step size is fixed in common to the same all the level numbers as shown in Table 2 (which shows an example in which the quantization step is "5") and a variable-length code is employed, as the transmission code, whose code length gradually increases from the innermost or smallest level number toward the outermost or largest one on either side thereof, reflecting the property of the prediction error signal. Accordingly, the latter system is excellent from the viewpoint of reducing the required number of transmission bits, and high efficiency coding system usually employ linear quantization technique.

TABLE 1

| Level No. | Input Level Range | Representative Output Value (Representative Quantized Value) | Transmission Code |
|---|---|---|---|
| . | . | . | . |
| . | . | . | . |
| . | . | . | . |
| −9 | −119~−100 | −109 | 11000 |
| −8 | −99~−72 | −85 | 10111 |
| −7 | −71~−56 | −62 | 10110 |
| −6 | −55~−42 | −48 | 10101 |
| −5 | −41~−30 | −35 | 10100 |
| −4 | −29~−20 | −24 | 10011 |
| −3 | −19~−12 | −15 | 10010 |
| −2 | −11~−6 | −8 | 10001 |
| −1 | −5~−2 | −3 | 10000 |
| 0 | −1~1 | 0 | 00000 |
| 1 | 2~5 | 3 | 00001 |
| 2 | 6~11 | 8 | 00010 |
| 3 | 12~19 | 15 | 00011 |
| 4 | 20~29 | 24 | 00100 |
| 5 | 30~41 | 35 | 00101 |
| 6 | 42~55 | 48 | 00110 |
| 7 | 56~71 | 62 | 00111 |
| 8 | 72~99 | 85 | 01000 |
| 9 | 100~119 | 109 | 01001 |
| . | . | . | . |
| . | . | . | . |
| . | . | . | . |

TABLE 2

| Level No. | Input Level Range | Representative Output Value (Representative Quantized Value) | Transmission Code |
|---|---|---|---|
| . | . | . | . |
| . | . | . | . |
| . | . | . | . |
| −9 | −47~−43 | −45 | 010000000101 |
| −8 | −42~−38 | −40 | 01000000011 |
| −7 | −37~−33 | −35 | 010000001 |
| −6 | −32~−28 | −30 | 01000001 |
| −5 | −27~−23 | −25 | 0100001 |
| −4 | −22~−18 | −20 | 010001 |
| −3 | −17~−13 | −15 | 01001 |
| −2 | −12~−8 | −10 | 0101 |
| −1 | −7~−3 | −5 | 011 |
| 0 | −2~2 | 0 | 1 |
| 1 | 3~7 | 5 | 001 |
| 2 | 8~12 | 10 | 0001 |
| 3 | 13~17 | 15 | 00001 |
| 4 | 18~22 | 20 | 000001 |
| 5 | 23~27 | 25 | 0000001 |
| 6 | 28~32 | 30 | 00000001 |
| 7 | 33~37 | 35 | 000000001 |
| 8 | 38~42 | 40 | 0000000011 |
| 9 | 43~47 | 45 | 00000000010 |
| . | . | . | . |
| . | . | . | . |
| . | . | . | . |

In the reduction of the required number of transmission bits by nonlinear or linear quantization, an increase in the quantization step size will decrease the number of bits but, at the same time, it will cause an increase in the amount of coding noise which is superimposed on coded image signals. Accordingly, in case of obtaining a coded image as faithful to the original image as possible and of low coding noise, the quantization step size cannot be selected very large, and hence a substantial reduction of the required number of transmission bits is difficult.

To solve this problem, permit a sharp reduction of the required number of transmission bits and implement a high-quality coded image, the prior art has utilized a noise shaping filter in predictive coding.

Figure 2A:
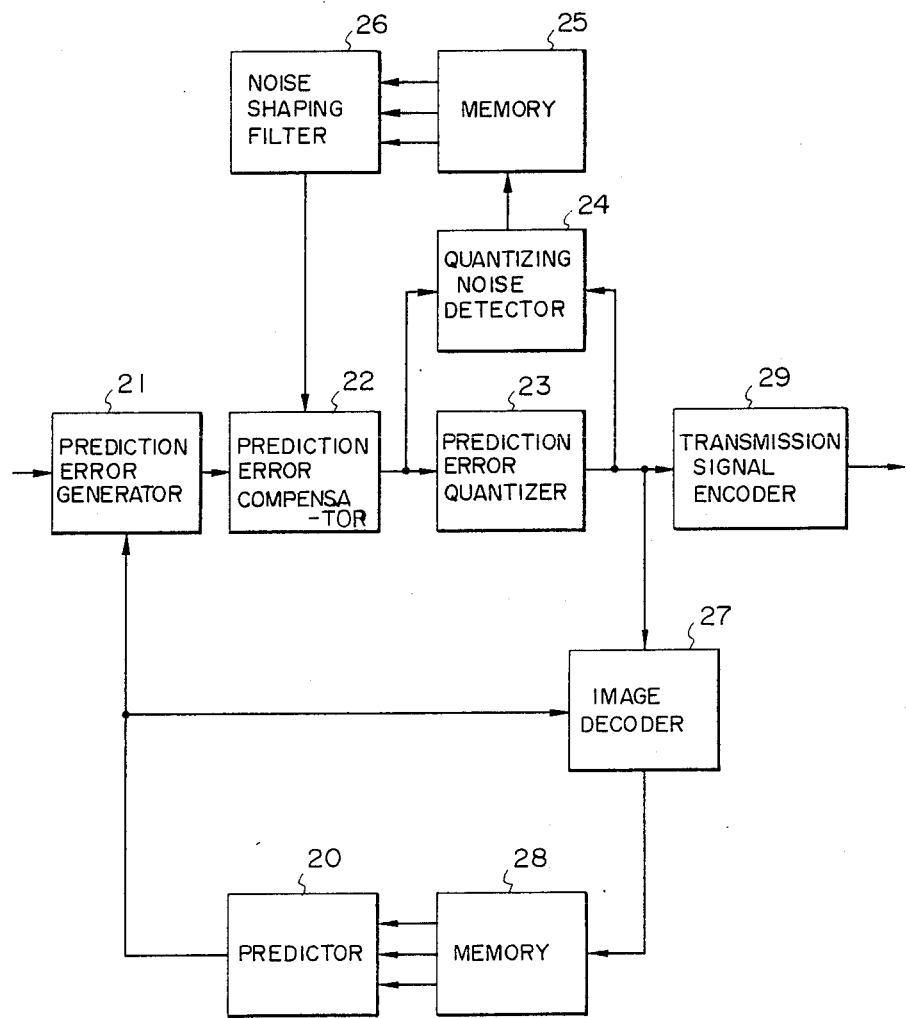
FIG. 2A is a block diagram of a conventional noise-shaping, predictive coding system.
Figure 2B:
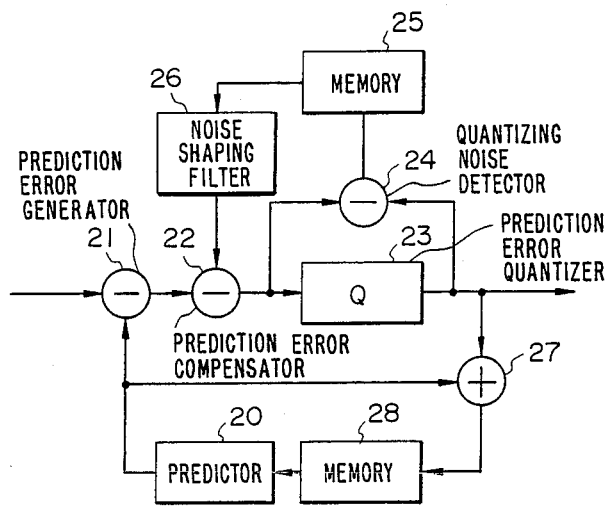
FIG. 2B is its equivalent circuit diagram.
Figure 2C:
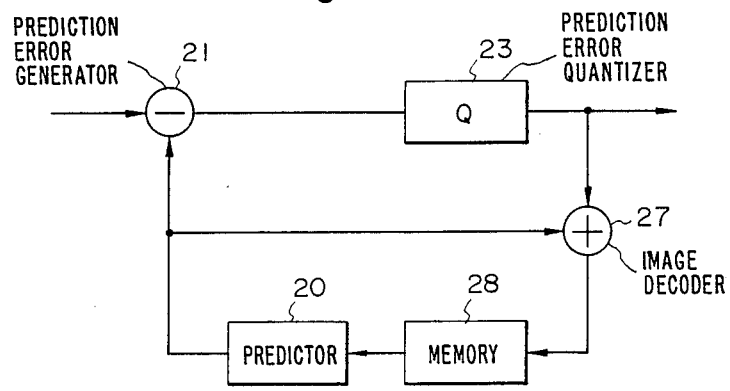
FIG. 2C is an equivalent circuit diagram of a conventional predictive coding system.

FIGS. 2A to 2C illustrate, by way of example, the arrangement of the transmitting side of the conventional predictive coding system employing a noise shaping filter (which system will hereinafter be referred to as the "noise-shaping, predictive coding system"), FIG. 2A being a block diagram and FIG. 2B an equivalent circuit. FIG. 2C shows, for reference, the circuit of a conventional predicitive coding system with no noise shaping filter (which system will hereinafter be referred to as the "predictive coding system"). In FIGS. 2A to 2C, reference numeral 20 indicate a predictor, 21 a prediction error generator which provides a difference between an input picture element value and a predicted value, 22 a prediction error compensator which corrects the prediction error value on the basis of an output value from a noise shaping filter 26 described later, 23 a prediction error quantizer which quantizes the corrected prediction error, 24 a quantizing noise detector which detects quantizing noise which is obtained from the difference between the quantized value and the prediction error value, 25 a memory for storing the detected quantizing noise signal, 26 a noise shaping filter which shapes the frequency characteristic of the quantizing noise, 27 an image decoder which decodes the input picture value from the quantized prediction error value and the predicted value, 28 a memory for storing a television signal, and 29 a transmission signal encoder which provides the quantized prediction error value on a transmission line.

The block diagram of FIG. 2A, with the prediction error compensator 22, the quantizing noise detector 24, the memory 25 and the noise shaping filter 26 removed therefrom, is the same as the block diagram of the conventional predictive coding system and its equivalent circuit is shown in FIG. 2C.

In this noise-shaping, predictive coding system a noise shaping filter value is produced on the basis of information about quantizing noise produced in an already coded image, and prediction error compensator is performed.

The receiving side of the noise-shaping, predictive coding system is exactly identical in construction with the receiving side of the predictive coding system which does not involve noise shaping.

Next, a description will be given of the effectiveness of the noise-shaping, predictive coding system and the problem to be settled.

In the noise-shaping predictive coding system, a coding noise $n_i$ which is a difference signal between an i-th (where i=O to M) input image $X_i$ and its decoded image $\overline{X}_i$ is given by Eq. (4) from Eq. (3).

$$\overline{X}_i = X_i - \Sigma h_j q_{i-j} + q_i \quad (3)$$

$$n_i = -\Sigma h_j q_{i-j} + q_i \quad (4)$$

where $q_i$ is quantizing noise occurring in the quantizing operation of the image $X_i$ and $h_j$ (where j=to l) is the coefficient of the noise shaping filter which acts on quantizing noise $q_{i-j}$.

The power spectrum N(wx, wu, wt) of this coding noise in its frequency region is given by Eq. (5).

$$N(wx, wy, wt) = |1 - H(wx, wy, wt)|^2 Q(wx, wy, wt) \quad (5)$$

In the above equation, H(wx, wy, wt) represents the transfer function (A Fourier-transformed value of $h_i$) of the noise shaping filter and Q(wx, wy, wt) represents the power spectrum of the quantizing noise.

Incidentally, the power spectrum of predictive coding noise, in case of employing no noise shaping filter, is Q(wx, wu, wt), and since this is white noise, its spectrum has a fixed magnitude regardless of frequency. On the other hand, studies of human visual characteristics reveal that noise having low-frequency components is more recognizable visually than noise having high-frequency components. Based on this fact, the coding noise which is originally white noise, as indicated by Eq. (5), is frequency shaped by the noise shaping filter into noise which fits the human visual characteristics. This ultimately makes the coding noise hard to be recognized visually, and hence equivalently improves the coded picture quality. The above is the effectiveness of the noise shaping filter.

The power $E[e_i^2]$ of a compensated prediction error signal $e_i$ which is applied to the quantizer is obtained by the following equation.

$$E[e_i^2] = E[(x_i - \hat{x}_i)^2] + \Sigma h_i^2 E[q_i^2] \quad (6)$$

where $\hat{x}_i$ is a predicted value of the input image $X_i$ and E[] is an expected value. As indicated by Eq. (6), the noise-shaping, predictive coding system increases the power by $\Sigma h_i^2 E[q_i^2]$ as compared with the ordinary predictive coding which does not involve noise shaping, and the noise shaping filter increases the amount of information. In connection with this increase in the amount of information, it is well-known that in case of employing a one-dimentional, first-order high-pass-type noise shaping filter $(H(W_x) = \int h_t \exp(-jw_x t))dt$, the amount of information increases by 0.3 to 0.5 bits in-terms of the entropy of a quantization representative value. The inclusion of the noise shaping filter 26 has the defect that the required number of transmission bits increases as many as about 4 to 5 megabits.

A description will be given now of first feature of the present invention to attain the above object of the present invention and to eliminate the above defects of prior art.

Table 3 is explanatory of the principle of the present invention, showing the transition characteristic of the quantization representative value obtained by simulation. As is evident from Table 3, when the quantization representative value of the current picture element ($X_i$) has a certain negative value, there is a very large probability that the quantization representative value is positive and equal in absolute value to the quantization representative value of the current picture element. The same is true of the case where the quantization representative value of the current picture element ($X_i$) is positive. The present invention is based on this characteristic, and the grounds for Table 3 will be described in detail.

TABLE 3

Transistion Characteristic of Quantization Representative Value

| $X_i$ | $X_{i+1}$ | | | | |
|---|---|---|---|---|---|
| | −22 | −11 | 0 | 11 | 22 |
| −22 | 0.001 | 0.003 | 0.004 | 0.002 | 0.000 |
| −11 | 0.003 | 0.019 | 0.087 | 0.109 | 0.002 |
| 0 | 0.005 | 0.088 | 0.367 | 0.081 | 0.005 |
| 11 | 0.001 | 0.108 | 0.081 | 0.017 | 0.004 |
| 22 | 0.000 | 0.002 | 0.005 | 0.004 | 0.002 |

Figure 3:
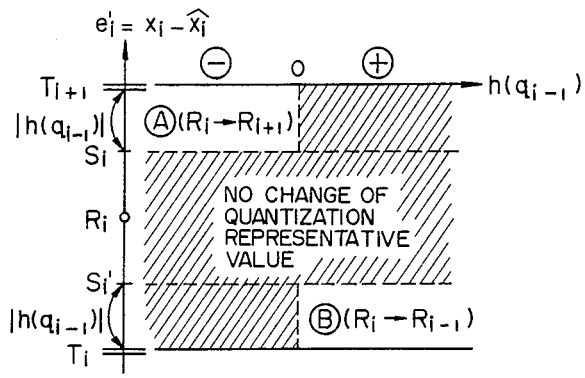
FIG. 3 is a diagram showing quantization representative value variation characteristics for explaining the principle of the present invention.

FIG. 3 is intended for describing the principle of the present invention more detail and is a characteristic diagram of a quantization representative value changing region in case of using the noise shaping filter.

In the interests of simplicity of the description, the following will describe a case of using a one-dimensional shaping filter $(hq_{i-l})$.

In FIG. 3, the vertical direction represents a prediction error signal $e'_i$ which is provided from the one-dimensional shaping filter, without involving feedback, and the horizontal direction shows the one-dimensional shaping filter $h(q_{i-l})$ in positive and negative regions. Reference characters $R_{i-l}$, $R_i$ and $R_{i+l}$ indicate quantization representative values, and $T_i$ and $T_{i+l}$ quantization determination values. Further, let it be assumed that $S_i$ and $S'_i$ are given by the following equations.

$$S_i = T_{i+l} - |h(q_{i-l})| \qquad (7)$$

$$S'_i = T_i + |h(q_{i-l})| \qquad (8)$$

In a case where the quantization representative value of the picture element $X_i$ varies owing to the feedback of the one-dimensional shaping filter $h(q_{i-l})$, that is, where the noise shaping filter produces its effect, the quantization representative value varies in both regions A and B shown in FIG. 3. The other hatched region is one where the quantization representative value behaves as in the case of ordinary DPCM in which the quantization representative value undergoes no variation. In the region A, the quantization representative value changes from $R_i$ to $R_{i+l}$ in a case where $S_i \leq e'_i \leq T_{i+l}$ and the one-dimensional shaping filter $h(q_{i-l})$ is negative. The quantizing noise $q_i$ and the coding noise $n_i$ which are superimposed on the picture element $X_i$ in this instance are expressed by the following equations.

$$q_i = R_{i+l} - (e'_i - h(q_{i-l})) > 0 \qquad (9)$$

$$n_i = -h(q_{i-l}) + q_i > 0 \qquad (10)$$

From the both equations the coding noise $n_i$ always becomes a positive value and is superimposed on the picture element $X_i$. Moreover, in the picture element $X_{i-l}$ a positive quantizing noise $(hq_i)$ is fed back, as a difference signal, for the prediction error signal $e'_{i+l}$, with the result that the quantization representative value of the picture element $X_{i+l}$ is very likely to become negative. In the region B, the quantization representative value changes from $R_i$ to $R_{i-l}$ in a case where $T_i \leq q'_i \leq S'_i$ and the one-dimensional shaping filter $h(q_{i-l})$ is positive. In consequence, the coding noise $n_i$ and the quantizing noise $q_i$ which are superimposed on the picture element $X_i$ both assume negative values as opposed to the case of the region A. In this instance, there is strong probability that the quantization representative value of the picture element $X_{i+l}$ becomes positive.

Table 3 shows the characteristics of quantized values of the pictvalue of the picture element $X_{i+l}$ becomes positive.

Table 3 shows the characteristics of quantized values of the picture elements $X_i$ and $X_{i+l}$ obtained by simulation using real image data, and the results of simulation support the above. These results shown in the table were obtained with a one-dimensional shaping filter having a coefficient $h_l = \frac{5}{8}$ for intra-field predictive, linear quantization (using a step size of 11/256). As shown in Table 3, when the quantization representative value of the picture element $X_i$ is +11, the probability of the quantization representative value of the picture element $X_{i+l}$ becoming −11 is higher than zero, whereas when the former is −11, the probability of the latter becoming +11 is high.

In view of the above-described deviation or so-called correlation of the quantization representative value which results from the use of the noise shaping filter, the present inventors considered that the quantization entropy could be reduced simply by slightly modifying the conventional noise-shaping, predictive coding system through utilization of the marked correlation.

(1st Embodiment)

Figure 4:
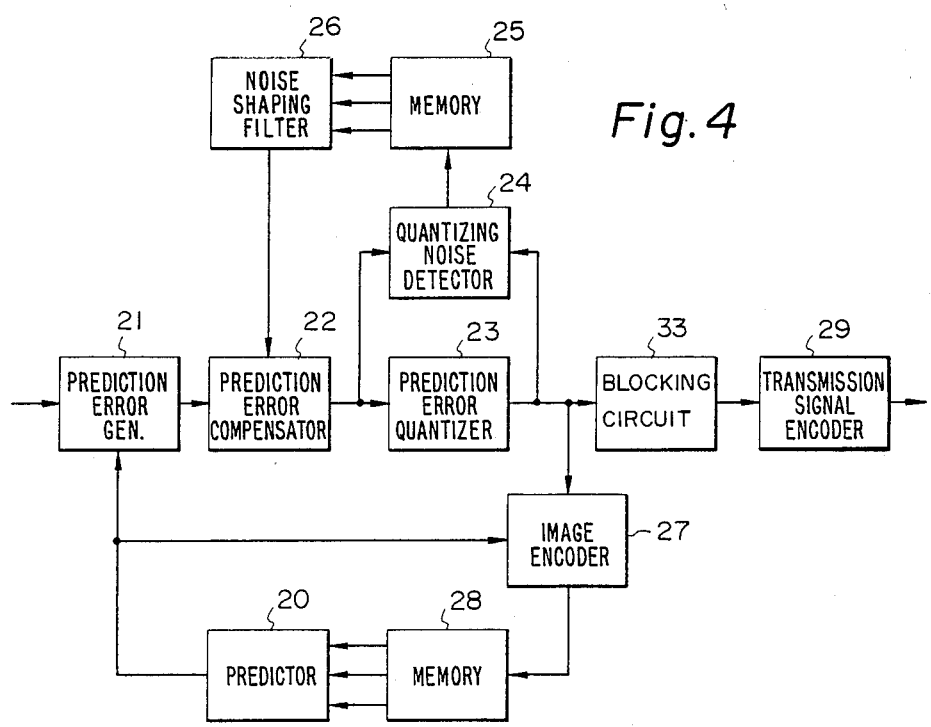
FIG. 4 is a block diagram illustrating the noise-shaping, predictive coding system which employs block quantization according to the present invention.

FIG. 4 illustrates in block form a first embodiment of the present invention which applies the block quantization technique of the present invention to the conventional noise-shaping, predictive coding system.

The embodiment depicted in FIG. 4 differs from the conventional arrangement in that a blocking section 33 is provided, at a stage preceding the transmission signal encoder 29, for consolidating quantization representative values of several picture elements into a block, to which codes are directly assigned.

For example, in a case where the number of quantization representative values for a block consisting of quantized values of two picture elements is 8, $8^2 = 64$ kinds of codes must be prepared for coding this block. In this instance, however, the number of coded bits necessary for transmitting the quantization representative value could be reduced by variable-length coding which assigns the shortest possible code to a combination of quantization representative values of high probability of occurrence and a long code to a combination of quantization representative values of low probability of occurrence through utilization of the above-mentioned quantization representative value variation characteristic by the noise shaping filter on which the present invention is based.

While in the above it is effective for reducing the number of coded bits to constitute one block with two to four picture elements, the number of picture elements which are consolidated into one block varies with the constitution of the noise shaping filter, the quantization characteristic and the kind of an image to be handled (a moving or still picture).

(2nd Embodiment)

Figure 5:
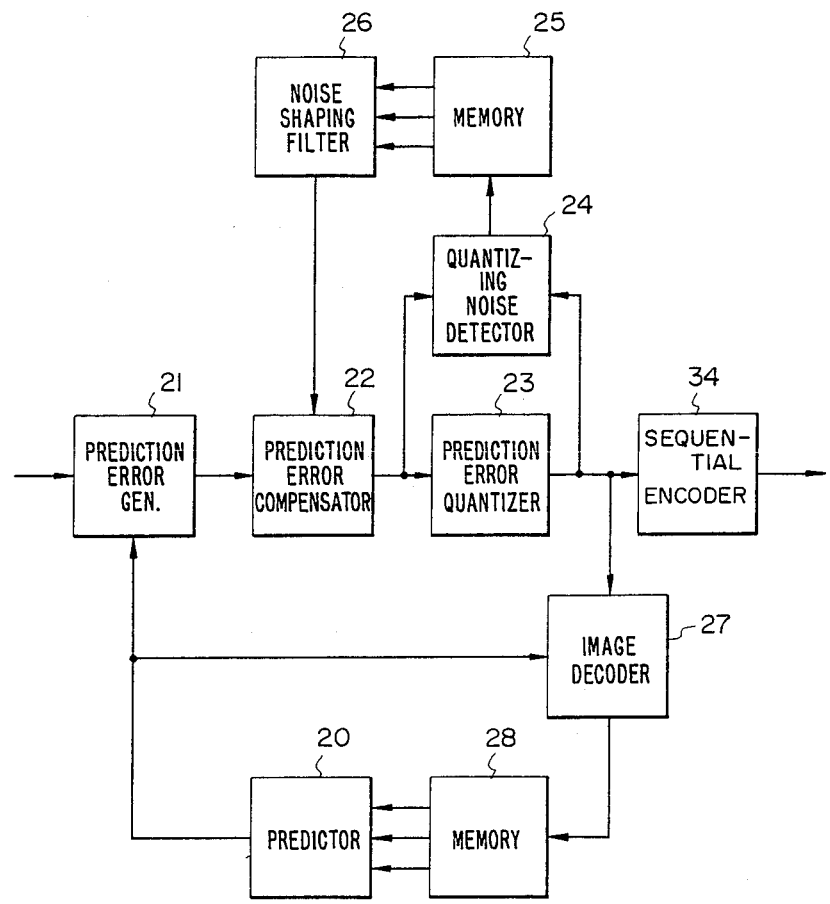
FIG. 5 is a block diagram illustrating the noise-shaping, predictive coding system which employs sort quantization according to the present invention.

FIG. 5 illustrates in block form a second embodiment of the present invention in which the sort quantization technique of the present invention is applied to the conventional noise-shaping, predictive coding system.

The embodiment of FIG. 5 differs from the conventional structure in substituting the transmission signal encoder 29 with a sequential encoder 34.

In the sequential adaptive encoder 31 the quantization representative value of the precoded immediately preceding picture element is used to determine the code which is assigned to the quantization representative value of the next picture element and sequential coding is performed usin the thus determined code.

For instance, where the number of quantization representative values is eight, eight kinds of codes are prepared. In this case, however, coding appropriate to the probability of occurrence of the quantization representative value can be achieved by performing sequential variable-length coding whereby when the quantization representative value of the immediately previous picture element is negative, a short or long code is assigned to the quantization representative value of the next picture element depending on whether the latter is positive or negative, through utilization of the afore-mentioned quantization representative value variation characteristic by the noise shaping filter on which the present invention is based. In this way, the number of coding bits can be reduced.

As described above, the present invention is intended to decrease the quantization entropy to performing coding through use of a correlation between the quantization representative values.

Although the above embodiments have been described in terms of hardware, the invention can be implemented simply by changing software in the conventional system.

Table 4 shows the reduction of the quantization entropy obtained by simulation conducted under the same conditions as mentioned previously. As shown in Table 4, according to the 2nd embodiment, the amount of information can be reduced by about 0.1 bit per picture element as compared with the prior art arrangement, and a reduction of approximately 1.7 megabits can be achieved in terms of the overall television signal.

TABLE 4

| System | Conventional noise-shaping, predictive coding | Embodiment 1 | Embodiment 2 |
|---|---|---|---|
| Amount of information (bits/pel) | 1.588 | 1.503 | 1.474 |

A description will be given below of other features of the present invention.

The noise shaping filter is a filter by which a noise arising from predictive coding (white noise, in general) is frequency shaped into noise which is fit for the human visual characteristic that noise of low-frequency components is visually more recognizable than noise of high-frequency components. With the use of the noise shaping filter, however, power increases by $\Sigma h_j^2 E[q_i^2]$, as indicated by Eq. (6), with the result that the amount of information to be transmitted also increases 0.478 bit per picture element and as much as about 7 megabits for the entire television signal.

In view of the above, the present inventors studied as to whether or not the noise shaping filter could be dispensed with without lessening its pictures quality improving effect through more effective utilization of the human visual characteristic. As a result of their studies, it was found that the noise shaping filter need not be used when the absolute value of a difference between continuous picture elements ($|X_i - X_{i-n}|$) is greater than a certain threshold value Th. (This system will hereinafter be referred to as a "difference signal control system".)

The 2nd feature of the present invention employs this principle and will hereinbelow be described in more detail.

The following will describe an example in which the difference absolute value ($|X_i - X_{i-n}|$) is taken as an estimate value D and this estimate value is produced using picture element $X_i$ to be coded and the immediately preceding picture element $X_{i-l}$.

Let it be assumed that the estimate value D is derived from the picture elements $X_i$ and $X_{i-l}$ through use of the following Eq. (11):

$$D = |X_i - X_{i-l}| \qquad (11)$$

When the estimate value D is smaller than the preset threshold value Th, a corrected prediction error value is quantized. When $D \geq Th$, a prediction error value is quantized.

In other words, this system takes into account the visual characteristic that when a difference in value between adjacent picture elements is large, the picture quality is not markedly improved visually even if the noise shaping filter is employed. With this system it is possible to prevent, without lessening the picture quality improving effect, without lessening the picture quality improving effect, an increases in the quantization representative value which is usually caused by use of the noise shaping filter when $D \geq Th$.

Incidentally, according to experimental results by simulation in which a one-dimensional first-order high-pass noise shaping filter ($H(z) = h_1 Z^{-1}$, where $h_1$ is a filter coefficient of ⅝ and $Z^{-1}$ is a one picture element delay) was applied to linear quantization, intrafield pre-prediction for actual image data (SMPTE#15, 13.5 MHz sampled 8-bit monochrome signal), the system of the present invention produced the intended effect when the threshold value Th in Eq. (11) was smaller than 3 (Th=3 is called a detection limit), whereas the amounts of information in the conventional predictive coding system without the noise shaping filter and the conventional noise-shaping, predictive coding system were 1.110 (bits/pel) and 1.588 (bits/pel), respectively.

Next, a description will be given of the correlation of quantization representative values which is the gist of the 3rd feature of the present invention. On the quantizing method which utilizes the correlation characteristic of quantization representative values, a patent application was field on even data with this application, but this method will be described in detail.

Accordingly, the 3rd feature of the present invention is a combination of the selective use of the noise shaping filter through utilization of the afore-mentioned human visual characteristic and a third principle of utilizing the correlation between quantization representative values for coding.

(3rd Embodiment)

Figure 6:
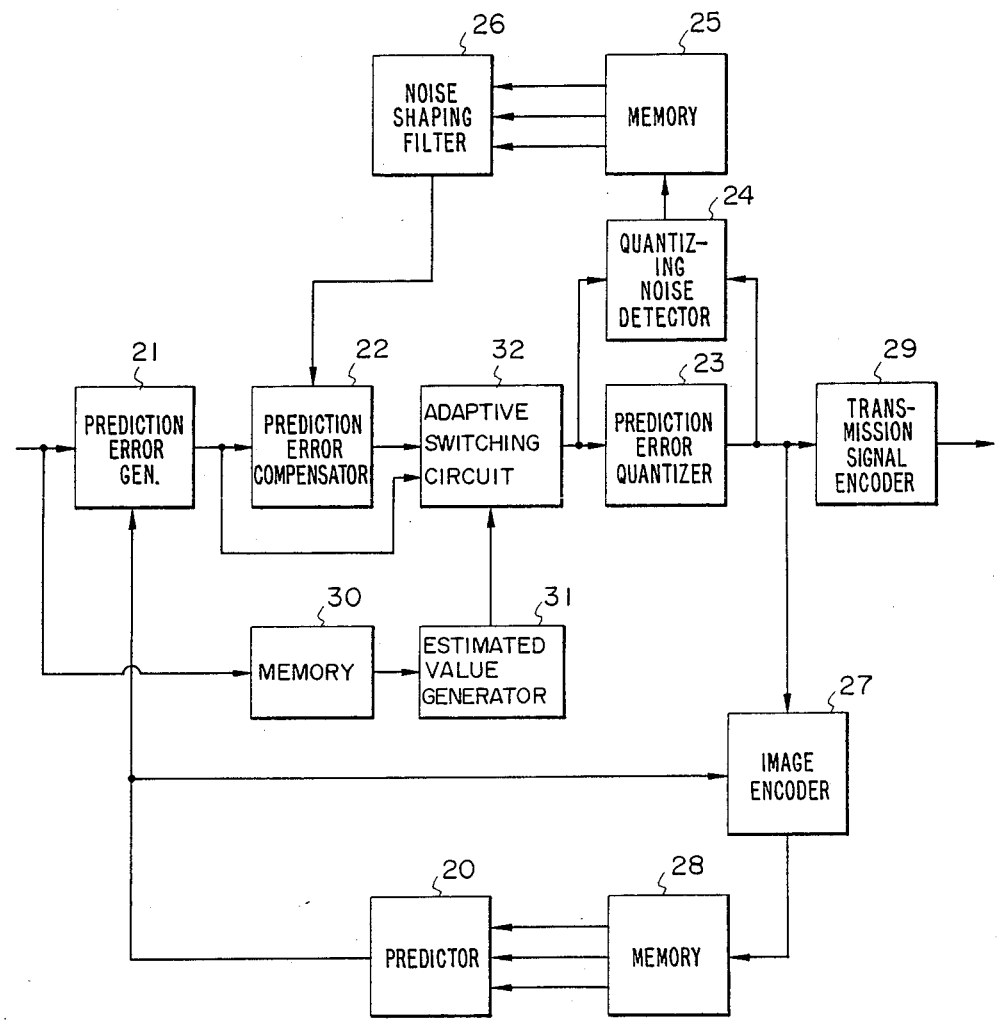
FIG. 6 is a block diagram of the noise-shaping, predictive coding system of the present invention which utilizes the human visual characteristic.

FIG. 6 illustrates in block form a 3rd embodiment of the present invention in which the difference signal control system of the present invention is added to the conventional noise-shaping, predictive coding system.

The embodiment of FIG. 6 differs from the conventional arrangement in the provision of a memory 30 for storing information of a precoded picture element, an estimated value generator 31 for producing the estimate value D from the value of the adjoining picture element stored in the memory 30, and an adaptive switching circuit 32 for comparing the predetermined threshold value Th with the estimate value D and for disabling the prediction error compensator when the estimate value D is greater than the threshold value Th.

In FIG. 6, when the prediction error value obtained from the prediction error generator 21 is compensated for with the noise shaping filter value obtained from the noise shaping filter 26, the estimate value D is obtained from the precoded picture element information and the estimate value D thus obtained is compared with the predetermined threshold value Th in the adaptive switching circuit 32. When D<Th (i.e. when a difference in value between the adjoining picture element is small), the prediction error value is compensated for with the noise shaping filter value from the noise shaping filter 26 and then quantized in the prediction error quantizer 23 on the basis of the quantization representative value as in the prior art. On the other hand, when D≧Th (i.e. when a difference in value between the adjoining picture element is large), the prediction error value from the prediction error generating section 21 is quantized directly in the prediction error quantizer 23.

In short, the present invention reduces the quantization entropy by selectively using the noise-shaping, predictive coding system and the mere predictive coding depending on whether D<Th and D≧Th.

(4th Embodiment)

Figure 7:
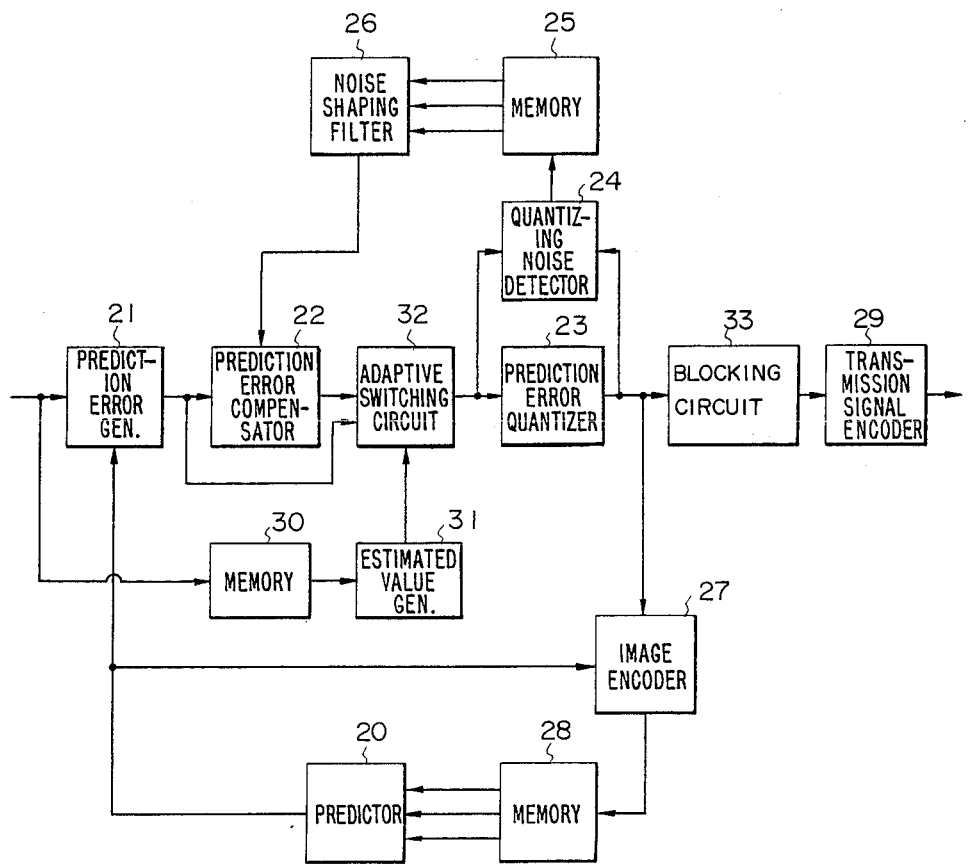
FIG. 7 is a block diagram of the noise-shaping, predictive coding system of the present invention which utilizes the human visual characteristic and block quantization in combination.

FIG. 7 illustrates in block form a 4th embodiment of the present invention which is another noise-shaping, predictive coding system.

This embodiment differs from the 3rd embodiment in that a blocking circuit 33 for consolidating several picture elements into a block is provided at the stage preceding the transmission signal encoder 29. That is, 4th embodiment possesses the block quantizing function of blocking every several picture elements through utilization of the correlation between quantization representative values which is one of the 3rd features of the present invention, in addition to the function of switching between the noiseshaping, predictive coding system and the predictive coding system on the basis of the human visual characteristic which is the 2nd feature of the present invention.

For example, in a case where the number of quantization representative values for a block consisting of quantized values of two picture elements is 8, $8^2=64$ kinds of codes must be prepared for coding this block. In this instance, however, the number of coding bits necessary for transmitting the quantization representative value could be reduced by variable-length coding which assigns the shortest possible code to a combination of quantization representative values of high probability of occurrence and a long code to a combination of quantization representative values of low probability of occurrence through utilization of the afore-mentioned quantization representative value variation characteristic by the noise shaping filter on which the present invention is based.

(5th Embodiment)

Figure 8:
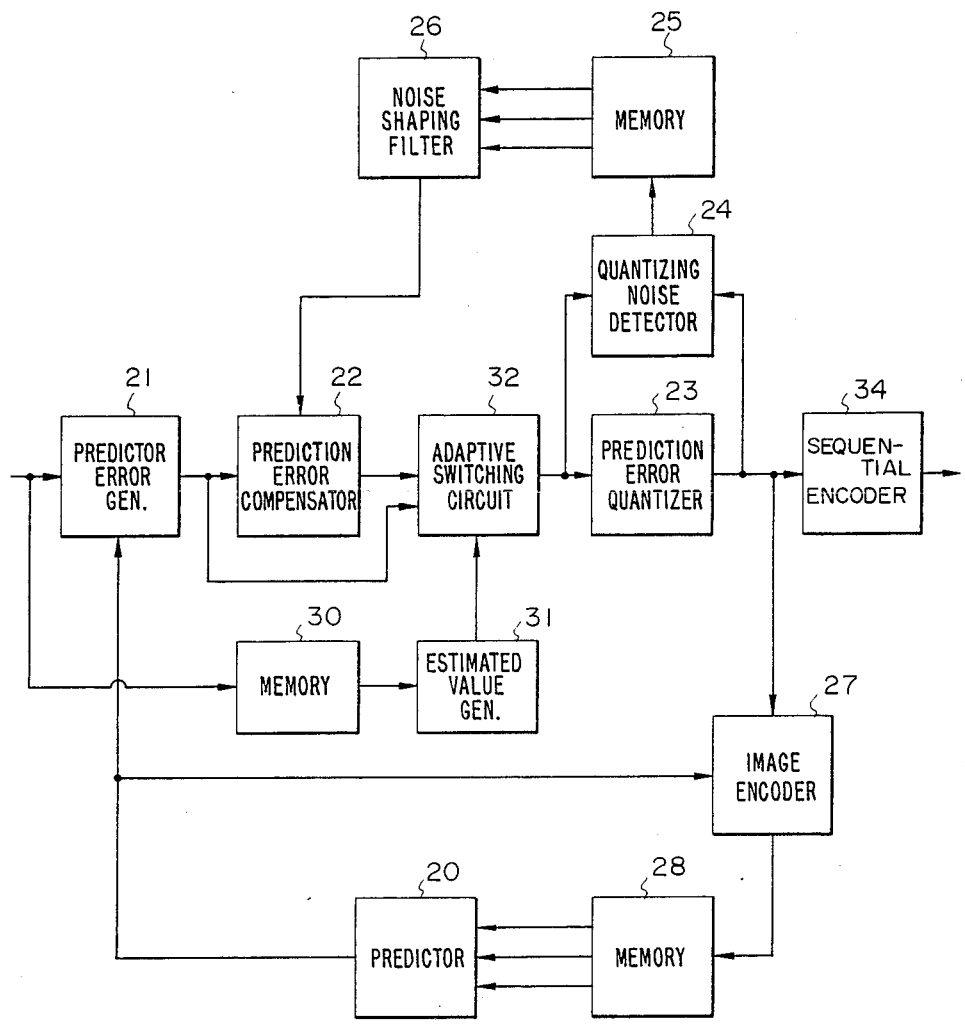
FIG. 8 is a block diagram of the noise-shaping, predictive coding system of the present invention which utilizes the human visual characteristic and sort quantization.

FIG. 8 illustrates in a block form a 5th embodiment of the present invention which is another noise-shaping, predictive coding system.

This embodiment differs from the 3rd embodiment in substituting the transmission signal coding section 29 with a sequential adaptive coding section 34. That is, the 5th embodiment possesses, in addition to the function of the 3rd embodiment, a sort quantizing function of adaptively changing the code to be assigned to the next quantization representative value on the basis of the quantization representative value of the immediately preceding picture element through utilization of the correlation between quantization representative values which is one of the 3rd features of the present invention.

In the sequential adaptive encoder 34 the quantization representative value of the precoded immediately preceding picture element is used to determine the code which is assigned to the quantization representative value of the next picture element and sequential adaptive coding is performed using the thus determined code.

For instance, where the number of quantization representative values is 8, eight kinds of codes are prepared. In this case, coding appropriate to the probability of occurrence of the quantization representative value can be achieved by performing sequential variable-length coding whereby when the quantization representative value of the immediately previous picture element is negative, a short or long code is assigned to the quantization representative value of the next picture element depending on whether the latter is positive or negative, through utilization of the afore-mentioned quantization representative value variation characteristic by the noise shaping filter on which the present invention is based. In this way, the number of coding bits can be reduced.

Figure 9:
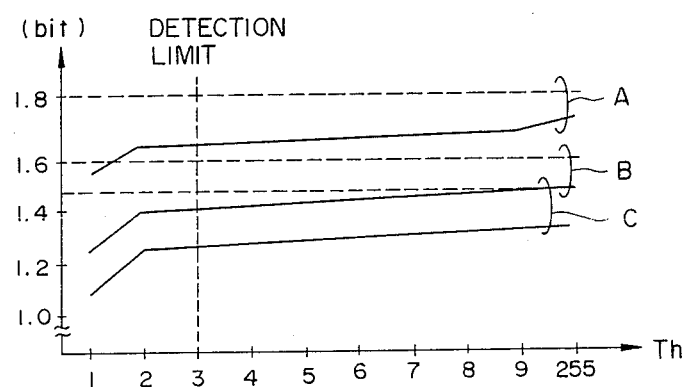
FIG. 9 is a graph showing the reduction of the number of bits, obtained by experiments on the noise-shaping, predictive coding system of the present invention shown in FIG. 8.

FIG. 9 is a graph showing the reduction of the number of bits according to experiments by simulation on the 5th embodiment.

In FIG. 9 the solid lines indicate the noise-shaping, predictive coding system of the present invention and the broken lines the conventional noise-shaping, predictive coding system, and (A), (B) and (C) show characteristics obtained with steps sizes of 7/256, 11/256 and 15/256, respectively. The experiments were conducted under the same conditions as those mentioned previously in connection with the comparison of the conventional noise-shaping, predictive coding and predictive coding systems.

As is evident from FIG. 9, the system of the present invention permits a substantial reduction of the number of bits, and even in the case of using the detection limit (Th=3) in the 3rd embodiment which utilizes the visual characteristic alone, a total of 0.18 bits or so can be decreased. That is, a reduction of about 3 megabits can be achieved in terms of the overall television signal.

As described above, according to the 1st feature of present invention, the deviation (i.e. the correlation) of quantization representative values, which occurs when the coding noise resulting from predictive coding is frequency shaped by a noise shaping filter, is used to perform coding, whereby the quantization entropy can be reduced substantially. This will ultimately improve the coded picture quality and reduce the required number of transmission bits. Hence, the present invention is of great utility.

According to other feature of the present invention, the present invention permits a substantial reduction of the quantization entropy by using the human visual characteristic singly or its combination with the deviation (i.e. the correlation) of quantization representative values which occurs when the coding noise resulting from predictive coding is frequency shaped. This will ultimately improve the coded picture quality and reduce the required number of transmission bits. Hence, the present invention is of great utility.

What we claim is:

1. A noise-shaping, predictive coding method using information of already coded picture elements to obtain a predicted value of a next picture element to be coded, comprising:
    obtaining a prediction error value between an input picture element and said predicted value;
    obtaining a noise shaping filter value for compensating for said prediction error value from information of quantizing noise superimposed on said already coded picture elements;
    quantizing a difference value between the prediction error value and said noise shaping filter value into a predetermined quantization representative value;
    consolidating quantization representative values of several picture elements into one block; and
    coding the one block using a short or long code which is assigned in dependence on whether the probability of occurrence of the assigned code is high or low.

2. A noise-shaping, predictive coding method using information of already coded picture elements to obtain a predicted value of a next picture element to be coded, comprising:
    obtaining a prediction error value between an input picture element and said predicted value;
    obtaining a noise shaping filter value for compensating for said prediction error value from information of quantizing noise superimposed on said already coded picture elements;
    quantizing a difference value between the prediction error value and said noise shaping filter value into a predetermined quantization representative value; and
    coding the next picture element by adaptively changing the code to be assigned to its quantization representative value on the basis of the quantization representative value of the already coded picture elements, through utilization of the correlation between the quantization representative values of the coded picture elements and the next picture element to be coded.

3. A noise-shaping, predictive coding method using information of already coded picture elements to obtain a predictive value of a next picture element to be coded, comprising:
    obtaining a prediction error value between an input picture element and the predicted value;
    obtaining a noise shaping filter value for compensating for the prediction error value from information of quantizing noise superimposed on the already coded picture elements;
    quantizing a difference value between the prediction error value and said noise shaping filter value using a predetermined quantization representative value;
    obtaining an estimate value, which is an absolute difference value between precoded picture elements, by compensating for the prediction error value with the noise shaping filter value;
    comparing the estimate value with a predetermined threshold value; and
    coding the prediction error value by quantizing it with the noise shaping filter value or by quantizing the prediction error value as it is in dependence on whether the estimate value is smaller or greater than the predetermined threshold value.

4. A noise-shaping, predictive coding method using information of already coded picture elements to obtain a predicted value of a next picture element to be coded, comprising:
    obtaining a predictive error value between an input picture element and the predicted value;
    obtaining a noise shaping filter value for compensating for the prediction error value from information of quantizing noise superimposed on the already coded picture elements;
    quantizing a difference value between the prediction error value and said noise shaping filter value using a predetermined quantization representative value;
    obtaining an estimate value which is an absolute difference value between precoded picture elements;
    comparing the estimate value with a predetermined threshold value;
    quantizing after compensating for the prediction error value with the noise shaping filter value in accordance with the results of said comparison;
    consolidating into one block the quantization representative values of several picture elements through utilization of the correlation between quantization representative values used for the selective compensating for and quantization of the prediction error value; and
    coding said one block.

5. A noise-shaping, predictive coding method using information of already coded picture elements to obtain a predicted value of a next picture element to be coded, comprising:
    obtaining a predictive error value between an input picture element and the predicted value;
    obtaining a noise shaping filter value for compensating for the prediction error value from information of quantizing noise superimposed on the already coded picture elements;
    quantizing a difference value between the prediction error value and said noise shaping filter value using a predetermined quantization representative value;
    obtaining an estimate value which is an absolute difference value between precoded picture elements;
    comparing the estimate value with a predetermined threshold value;
    quantizing after compensating for the prediction error value with the noise shaping filter value in accordance with the results of said comparison; and
    coding the quantization representative value of the next picture element by adaptively changing the code to be assigned thereto on the basis of the quantization representative value of the immediately preceding picture element.

* * * * *